United States Patent
Huang et al.

(10) Patent No.: US 10,135,524 B2
(45) Date of Patent: Nov. 20, 2018

(54) METHOD AND APPARATUS FOR COMPENSATING FOR SIGNAL ERROR AT TRANSMIT END OF OPTICAL TIME DOMAIN REFLECTOMETER

(71) Applicant: Huawei Technologies Co., Ltd., Shenzhen, Guangdong (CN)

(72) Inventors: Yansui Huang, Shenzhen (CN); Xiaodong Luo, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/687,220

(22) Filed: Aug. 25, 2017

(65) Prior Publication Data
US 2017/0353238 A1    Dec. 7, 2017

Related U.S. Application Data

(63) Continuation of application No. PCT/CN2015/073428, filed on Feb. 28, 2015.

(51) Int. Cl.
*H04B 10/071* (2013.01)

(52) U.S. Cl.
CPC .................. *H04B 10/071* (2013.01)

(58) Field of Classification Search
CPC ............ H04B 10/071; H04B 10/2507; G01M 11/3118; G01M 11/3145; G01M 11/3109; H04L 43/50
USPC ........................................... 398/16
See application file for complete search history.

(56) References Cited

U.S. PATENT DOCUMENTS

| | | | |
|---|---|---|---|
| 5,416,623 A * | 5/1995 | Dawson | G01M 11/3118 398/16 |
| 5,754,603 A | 5/1998 | Thomas et al. | |
| 7,474,688 B2 | 1/2009 | McDonough et al. | |
| 2012/0237213 A1* | 9/2012 | Yin | H04L 43/50 398/28 |

(Continued)

FOREIGN PATENT DOCUMENTS

| CN | 101123449 A | 2/2008 |
|---|---|---|
| WO | 0155837 A1 | 8/2001 |

OTHER PUBLICATIONS

Shim et al.; "Demonstration of Correlation-Based OTDR for In-Service Monitoring of 64-Split TDM PON"; OFC/NFOEC Technical Digest; Optical Society of America; 2012; 3 pages.

*Primary Examiner* — Don N Vo (57) ABSTRACT

A method for compensating for a signal error at a transmit end of an optical time domain reflectometer is provided. The method includes: detecting an actual signal sequence of a PN sequence sent by a transmitter to a measured optical fiber and an actual signal sequence of an optical signal and reflected back by the measured optical fiber and received by a receiver; obtaining a compensation value of the optical signal that attenuates in a process in which the optical signal is reflected by the measured optical fiber; computing an optical fiber attenuation curve function obtained through a current iteration; and determining, when determining that the optical fiber attenuation curve function obtained through the current iteration satisfies a given condition, performance of the measured optical fiber according to the optical fiber attenuation curve function obtained through the current iteration.

20 Claims, 3 Drawing Sheets

(56) References Cited

U.S. PATENT DOCUMENTS

| | | | |
|---|---|---|---|
| 2013/0148958 A1* | 6/2013 | Liang | H04B 10/071 398/13 |
| 2013/0202287 A1 | 8/2013 | Joffe | |
| 2014/0003821 A1* | 1/2014 | Joffe | H04B 10/2507 398/147 |
| 2015/0188626 A1* | 7/2015 | Viswanathan | G01M 11/3118 398/21 |

* cited by examiner

METHOD AND APPARATUS FOR COMPENSATING FOR SIGNAL ERROR AT TRANSMIT END OF OPTICAL TIME DOMAIN REFLECTOMETER

CROSS-REFERENCE TO RELATED APPLICATIONS

This application is a continuation of International Application No. PCT/CN2015/073428, filed on Feb. 28, 2015, the disclosure of which is hereby incorporated by reference in its entirety.

TECHNICAL FIELD

The present application relates to the field of optical communications technologies, and in particular, to a method and an apparatus for compensating for a signal error at a transmit end of an optical time domain reflectometer.

BACKGROUND

In an optical communications network, an optical time domain reflectometer (OTDR) is an effective method for monitoring a fiber link. During optical pulse transmission, an optical fiber produces reflection and attenuation due to Rayleigh scattering, an optical fiber splice, a splice point, and other reasons.

Optical fiber performance (for example, a length of the optical fiber) that can be detected by the OTDR is affected by an attenuation coefficient of the optical fiber, and detection performance of the OTDR cannot be accurately reflected. Therefore, the detection performance of the OTDR is generally described by using a dynamic range.

The dynamic range of the OTDR represents a maximum optical loss that can be analyzed by the OTDR when a back-scatter level of an OTDR port drops to a specific noise level.

For example, the OTDR transmits optical pulses to a to-be-measured optical fiber, and detects reflected lights that are reflected back from the optical fiber and that have undergone reflection and attenuation. Information such as reflection and attenuation of the optical fiber, that is, an optical fiber attenuation curve, is obtained according to a relationship between intensity and time of reflected optical pulses. In this way, the optical fiber performance is detected, and the dynamic range of the OTDR is obtained.

Specifically, the optical pulses transmitted by the OTDR are classified into a single optical pulse and multiple optical pulses.

For a single optical pulse transmitted by the OTDR, the OTDR transmits a single optical pulse to the to-be-measured optical fiber to detect a reflected light from the optical pulse, so as to obtain an optical fiber attenuation curve of the detected reflected light.

However, when the optical fiber performance is being detected, there is a defect that an optical signal at the band needs to be turned off, that is, a data service is interrupted.

For multiple optical pulses transmitted by the OTDR, the OTDR transmits a pseudo-random (PN) optical pulse sequence (that is, a PN sequence) to the to-be-measured optical fiber to detect an optical signal reflected by the optical fiber, and perform correlation computation on the detected optical signal and the PN sequence, so as to obtain an optical fiber attenuation curve.

Although a data service does not need to be interrupted during optical fiber performance detection, and real-time detection of the optical fiber performance is implemented, the multiple optical pulses transmitted by the OTDR are distorted due to filtering of a transmitter, noise, and other reasons, causing that a weak reflected signal at a far end of the optical fiber is drown in noise. Consequently, the optical fiber performance that can be detected by the OTDR drops, that is, the dynamic range of the OTDR is reduced.

SUMMARY

In view of this, embodiments of the present disclosure provide a method and an apparatus for compensating for a signal error at a transmit end of an optical time domain reflectometer, so as to resolve an existing problem that a dynamic range of a multi-pulse OTDR is reduced.

According to a first aspect, a method for compensating for a signal error at a transmit end of an optical time domain reflectometer is provided, including:

detecting an actual signal sequence of a pseudo-random optical pulse PN sequence sent by a transmitter to a measured optical fiber and an actual signal sequence of an optical signal reflected back by the measured optical fiber and received by a receiver;

obtaining, through computation and according to the actual signal sequence of the PN sequence, a theoretical signal sequence of the PN sequence, and an optical fiber attenuation curve function obtained through an adjacent previous iterative computation, a compensation value of the optical signal that attenuates in a process in which the optical signal is reflected by the measured optical fiber;

computing, according to the actual signal sequence of the optical signal, the compensation value, and the theoretical signal sequence of the PN sequence, an optical fiber attenuation curve function obtained through a current iteration; and determining, when determining that the optical fiber attenuation curve function obtained through the current iteration satisfies a given condition, performance of the measured optical fiber according to the optical fiber attenuation curve function obtained through the current iteration.

With reference to the first aspect of the present disclosure, in a first possible implementation of the first aspect, the determining that the optical fiber attenuation curve function obtained through the current iteration satisfies a given condition includes:

computing a difference between the optical fiber attenuation curve function obtained through the current iteration and the optical fiber attenuation curve function obtained through the adjacent previous iterative computation;

comparing the difference with a given threshold; and when the difference is less than the given threshold, determining that the optical fiber attenuation curve function obtained through the current iteration satisfies the given condition.

With reference to the first possible implementation of the first aspect, in a second possible implementation of the first aspect, the method further includes:

when the difference is not less than the given threshold, determining that the optical fiber attenuation curve function obtained through the current iteration does not satisfy the given condition, and triggering to perform an operation of computing, by using the optical fiber attenuation curve function obtained through the current iteration, a compensation value of the optical signal that attenuates in a next process in which the optical signal is reflected by the measured optical fiber.

With reference to the first aspect, or with reference to the first possible implementation of the first aspect, or with reference to the second possible implementation of the first aspect, in a third possible implementation of the first aspect, the obtaining, through computation and according to the actual signal sequence of the PN sequence, a theoretical signal sequence of the PN sequence, and an optical fiber attenuation curve function obtained through an adjacent previous iterative computation, a compensation value of the optical signal that attenuates in a process in which the optical signal is reflected by the measured optical fiber includes:

computing a difference between the actual signal sequence of the PN sequence and the theoretical signal sequence of the PN sequence; and obtaining, through computation and according to the difference and the optical fiber attenuation curve function obtained through the adjacent previous iterative computation, the compensation value of the optical signal that attenuates in a process in which the optical signal is reflected by the measured optical fiber.

With reference to the third possible implementation of the first aspect, in a fourth possible implementation of the first aspect, the obtaining, through computation and according to the difference between the signal sequences and the optical fiber attenuation function obtained through the adjacent previous iterative computation, the compensation value of the optical signal that attenuates in a process in which the optical signal is reflected by the measured optical fiber includes:

obtaining, through computation and according to a function relationship between an optical fiber attenuation function of an optical time domain reflectometer and a correlation computation result of multiple optical pulses transmitted by the transmitter and an optical signal reflected by the optical fiber and received by the receiver, the difference, and the optical fiber attenuation function obtained through the adjacent previous iterative computation, the compensation value of the optical signal that attenuates in a process in which the optical signal is reflected by the measured optical fiber.

With reference to the first aspect, or with reference to the first possible implementation of the first aspect, or with reference to the second possible implementation of the first aspect, or with reference to the third possible implementation of the first aspect, or with reference to the fourth possible implementation of the first aspect, in a fifth possible implementation of the first aspect, the computing, according to the actual signal sequence of the optical signal, the compensation value, and the theoretical signal sequence of the PN sequence, an optical fiber attenuation curve function obtained through a current iteration includes:

obtaining, through computation, a theoretical signal sequence of the optical signal according to the actual signal sequence of the optical signal and the compensation value; and computing, according to the theoretical signal sequence of the optical signal and the theoretical signal sequence of the PN sequence, the optical fiber attenuation curve function obtained through the current iteration.

With reference to the fifth possible implementation of the first aspect, in a sixth possible implementation of the first aspect, the computing, according to the theoretical signal sequence of the optical signal and the theoretical signal sequence of the PN sequence, the optical fiber attenuation curve function obtained through the current iteration includes:

performing, according to the function relationship between an optical fiber attenuation function of an optical time domain reflectometer and a correlation computation result of multiple optical pulses transmitted by a transmitter and an optical signal reflected by an optical fiber and received by a receiver, correlation computation on the theoretical signal sequence of the optical signal and the theoretical signal sequence of the PN sequence, to obtain the optical fiber attenuation curve function obtained through the current iteration.

With reference to the first aspect, or with reference to the first possible implementation of the first aspect, or with reference to the second possible implementation of the first aspect, or with reference to the third possible implementation of the first aspect, or with reference to the fourth possible implementation of the first aspect, or with reference to the fifth possible implementation of the first aspect, or with reference to the sixth possible implementation of the first aspect, in a seventh possible implementation of the first aspect, when computation of the compensation value is triggered for the first time, the optical fiber attenuation curve function obtained through the adjacent previous iterative computation includes at least one of the following optical fiber attenuation curve functions:

an optical fiber attenuation curve function obtained through an offline test; or a prestored optical fiber attenuation curve function.

According to a second aspect, an apparatus for compensating for a signal error at a transmit end of an optical time domain reflectometer is provided, including:

a measurement unit, configured to detect an actual signal sequence of a pseudo-random optical pulse PN sequence sent by a transmitter to a measured optical fiber and an actual signal sequence of an optical signal reflected back by the measured optical fiber and received by a receiver;

a compensation unit, configured to obtain, through computation and according to the actual signal sequence of the PN sequence, a theoretical signal sequence of the PN sequence, and an optical fiber attenuation curve function obtained through an adjacent previous iterative computation, a compensation value of the optical signal that attenuates in a process in which the optical signal is reflected by the measured optical fiber;

a computation unit, configured to compute, according to the actual signal sequence of the optical signal, the compensation value, and the theoretical signal sequence of the PN sequence, an optical fiber attenuation curve function obtained through a current iteration; and a determining unit, configured to determine, when determining that the optical fiber attenuation curve function obtained through the current iteration satisfies a given condition, performance of the measured optical fiber according to the optical fiber attenuation curve function obtained through the current iteration.

With reference to the second aspect of the present disclosure, in a first possible implementation of the second aspect, that the determining unit is specifically configured to determine that the optical fiber attenuation curve function obtained through the current iteration satisfies a given condition includes:

computing a difference between the optical fiber attenuation curve function obtained through the current iteration and the optical fiber attenuation curve function obtained through the adjacent previous iterative computation;

comparing the difference with a given threshold; and when the difference is less than the given threshold, determining that the optical fiber attenuation curve function obtained through the current iteration satisfies the given condition.

With reference to the first possible implementation of the second aspect, in a second possible implementation of the second aspect, the determining unit is further configured to: when the difference is not less than the given threshold, determine that the optical fiber attenuation curve function obtained through the current iteration does not satisfy the given condition, and trigger to perform an operation of computing, by using the optical fiber attenuation curve function obtained through the current iteration, a compensation value of the optical signal that attenuates in a next process in which the optical signal is reflected by the measured optical fiber.

With reference to the second aspect, or with reference to the first possible implementation of the second aspect, or with reference to the second possible implementation of the second aspect, in a third possible implementation of the second aspect, the compensation unit is specifically configured to: compute a difference between the actual signal sequence of the PN sequence and the theoretical signal sequence of the PN sequence; and obtain, through computation and according to the difference and the optical fiber attenuation curve function obtained through the adjacent previous iterative computation, the compensation value of the optical signal that attenuates in a process in which the optical signal is reflected by the measured optical fiber.

With reference to the third possible implementation of the second aspect, in a fourth possible implementation of the second aspect, that the compensation unit is specifically configured to obtain, through computation and according to the difference between the signal sequences and the optical fiber attenuation function obtained through the adjacent previous iterative computation, the compensation value of the optical signal that attenuates in a process in which the optical signal is reflected by the measured optical fiber includes:

obtaining, through computation and according to a function relationship between an optical fiber attenuation function of an optical time domain reflectometer and a correlation computation result of multiple optical pulses transmitted by the transmitter and an optical signal reflected by the optical fiber and received by the receiver, the difference, and the optical fiber attenuation function obtained through the adjacent previous iterative computation, the compensation value of the optical signal that attenuates in a process in which the optical signal is reflected by the measured optical fiber.

With reference to the second aspect, or with reference to the first possible implementation of the second aspect, or with reference to the second possible implementation of the second aspect, or with reference to the third possible implementation of the second aspect, or with reference to the fourth possible implementation of the second aspect, in a fifth possible implementation of the second aspect, the computation unit is specifically configured to obtain, through computation, a theoretical signal sequence of the optical signal according to the actual signal sequence of the optical signal and the compensation value; and compute, according to the theoretical signal sequence of the optical signal and the theoretical signal sequence of the PN sequence, the optical fiber attenuation curve function obtained through the current iteration.

With reference to the fifth possible implementation of the second aspect, in a sixth possible implementation of the second aspect, that the computation unit is specifically configured to compute, according to the theoretical signal sequence of the optical signal and the theoretical signal sequence of the PN sequence, the optical fiber attenuation curve function obtained through the current iteration includes:

performing, according to the function relationship between an optical fiber attenuation function of an optical time domain reflectometer and a correlation computation result of multiple optical pulses transmitted by a transmitter and an optical signal reflected by an optical fiber and received by a receiver, correlation computation on the theoretical signal sequence of the optical signal and the theoretical signal sequence of the PN sequence, to obtain the optical fiber attenuation curve function obtained through the current iteration.

With reference to the second aspect, or with reference to the first possible implementation of the second aspect, or with reference to the second possible implementation of the second aspect, or with reference to the third possible implementation of the second aspect, or with reference to the fourth possible implementation of the second aspect, or with reference to the fifth possible implementation of the second aspect, or with reference to the sixth possible implementation of the second aspect, in a seventh possible implementation of the second aspect, when computation of the compensation value is triggered for the first time, the optical fiber attenuation curve function obtained through the adjacent previous iterative computation includes at least one of the following optical fiber attenuation curve functions:

an optical fiber attenuation curve function obtained through an offline test; or a prestored optical fiber attenuation curve function.

According to a third aspect, an apparatus for compensating for a signal error at a transmit end of an optical time domain reflectometer is provided, including:

a optoelectronic detection device, configured to detect an actual signal sequence of a pseudo-random optical pulse PN sequence sent by a transmitter to a measured optical fiber and an actual signal sequence of an optical signal reflected back by the measured optical fiber and received by a receiver; and a processing device, configured to obtain, through computation and according to the actual signal sequence of the PN sequence detected by the optoelectronic detection device, a theoretical signal sequence of the PN sequence, and an optical fiber attenuation curve function obtained through an adjacent previous iterative computation, a compensation value of the optical signal that attenuates in a process in which the optical signal is reflected by the measured optical fiber;

compute, according to the actual signal sequence of the optical signal detected by the optoelectronic detection device, the compensation value, and the theoretical signal sequence of the PN sequence, an optical fiber attenuation curve function obtained through a current iteration; and determine, when determining that the optical fiber attenuation curve function obtained through the current iteration satisfies a given condition, performance of the measured optical fiber according to the optical fiber attenuation curve function obtained through the current iteration.

With reference to the third aspect of the present disclosure, in a first possible implementation of the third aspect, that the processing device determines that the optical fiber attenuation curve function obtained through the current iteration satisfies a given condition includes:

computing a difference between the optical fiber attenuation curve function obtained through the current iteration and the optical fiber attenuation curve function obtained through the adjacent previous iterative computation;

comparing the difference with a given threshold; and when the difference is less than the given threshold, determining that the optical fiber attenuation curve function obtained through the current iteration satisfies the given condition.

With reference to the first possible implementation of the third aspect, in a second possible implementation of the third aspect, the processing device is further configured to: when the difference is not less than the given threshold, determine that the optical fiber attenuation curve function obtained through the current iteration does not satisfy the given condition, and trigger to perform an operation of computing, by using the optical fiber attenuation curve function obtained through the current iteration, a compensation value of the optical signal that attenuates in a next process in which the optical signal is reflected by the measured optical fiber.

With reference to the third aspect, or with reference to the first possible implementation of the third aspect, or with reference to the second possible implementation of the third aspect, in a third possible implementation of the third aspect, that the processing device obtains, through computation and according to the actual signal sequence of the PN sequence, a theoretical signal sequence of the PN sequence, and an optical fiber attenuation curve function obtained through an adjacent previous iterative computation, a compensation value of the optical signal that attenuates in a process in which the optical signal is reflected by the measured optical fiber includes:

computing a difference between the actual signal sequence of the PN sequence and the theoretical signal sequence of the PN sequence; and obtaining, through computation and according to the difference and the optical fiber attenuation curve function obtained through the adjacent previous iterative computation, the compensation value of the optical signal that attenuates in a process in which the optical signal is reflected by the measured optical fiber.

With reference to the third possible implementation of the third aspect, in a fourth possible implementation of the third aspect, that the processing device obtains, through computation and according to the difference between the signal sequences and the optical fiber attenuation function obtained through the adjacent previous iterative computation, the compensation value of the optical signal that attenuates in a process in which the optical signal is reflected by the measured optical fiber includes:

obtaining, through computation and according to a function relationship between an optical fiber attenuation function of an optical time domain reflectometer and a correlation computation result of multiple optical pulses transmitted by the transmitter and an optical signal reflected by the optical fiber and received by the receiver, the difference, and the optical fiber attenuation function obtained through the adjacent previous iterative computation, the compensation value of the optical signal that attenuates in a process in which the optical signal is reflected by the measured optical fiber.

With reference to the third aspect, or with reference to the first possible implementation of the third aspect, or with reference to the second possible implementation of the third aspect, or with reference to the third possible implementation of the third aspect, or with reference to the fourth possible implementation of the third aspect, in a fifth possible implementation of the third aspect, that the processing device computes, according to the actual signal sequence of the optical signal, the compensation value, and the theoretical signal sequence of the PN sequence, an optical fiber attenuation curve function obtained through a current iteration includes:

obtaining, through computation, a theoretical signal sequence of the optical signal according to the actual signal sequence of the optical signal and the compensation value; and computing, according to the theoretical signal sequence of the optical signal and the theoretical signal sequence of the PN sequence, the optical fiber attenuation curve function obtained through the current iteration.

With reference to the fifth possible implementation of the third aspect, in a sixth possible implementation of the third aspect, that the processing device computes, according to the theoretical signal sequence of the optical signal and the theoretical signal sequence of the PN sequence, the optical fiber attenuation curve function obtained through the current iteration includes:

performing, according to the function relationship between an optical fiber attenuation function of an optical time domain reflectometer and a correlation computation result of multiple optical pulses transmitted by a transmitter and an optical signal reflected by an optical fiber and received by a receiver, correlation computation on the theoretical signal sequence of the optical signal and the theoretical signal sequence of the PN sequence, to obtain the optical fiber attenuation curve function obtained through the current iteration.

With reference to the third aspect, or with reference to the first possible implementation of the third aspect, or with reference to the second possible implementation of the third aspect, or with reference to the third possible implementation of the third aspect, or with reference to the fourth possible implementation of the third aspect, or with reference to the fifth possible implementation of the third aspect, or with reference to the sixth possible implementation of the third aspect, in a seventh possible implementation of the third aspect, when computation of the compensation value is triggered for the first time, the optical fiber attenuation curve function obtained through the adjacent previous iterative computation includes at least one of the following optical fiber attenuation curve functions:

an optical fiber attenuation curve function obtained through an offline test; or a prestored optical fiber attenuation curve function.

According to the embodiments of the present disclosure, an actual signal sequence of a PN sequence sent by a transmitter to a measured optical fiber and an actual signal sequence of an optical signal reflected back by the measured optical fiber and received by a receiver are detected; a compensation value of the optical signal that attenuates in a process in which the optical signal is reflected by the measured optical fiber is obtained through computation according to the actual signal sequence of the PN sequence, a theoretical signal sequence of the PN sequence, and an optical fiber attenuation curve function obtained through an adjacent previous iterative computation; an optical fiber attenuation curve function obtained through a current iteration is computed according to the actual signal sequence of the optical signal, the compensation value, and the theoretical signal sequence of the PN sequence; and whether the optical fiber attenuation curve function obtained through the current iteration satisfies a given condition is further determined, and when it is determined that the optical fiber attenuation curve function obtained through the current iteration satisfies the given condition, performance of the measured optical fiber is determined according to the optical fiber attenuation curve function obtained through the current iteration. In this way, real-time detection is performed on the PN sequence sent by the transmitter, real-time compensation is made for a reflected-back optical signal by using PN sequence change information obtained through detection, and an iterative algorithm is used. This effectively enhances a dynamic range of an optical time domain reflectometer.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To achieve an object of the present disclosure, embodiments of the present disclosure provides a method and an apparatus for compensating for a signal error at a transmit end of an optical time domain reflectometer. According to the embodiments of the present disclosure, an actual signal sequence of a PN sequence sent by a transmitter to a measured optical fiber and an actual signal sequence of an optical signal reflected back by the measured optical fiber and received by a receiver are detected; a compensation value of the optical signal that attenuates in a process in which the optical signal is reflected by the measured optical fiber is obtained through computation according to the actual signal sequence of the PN sequence, a theoretical signal sequence of the PN sequence, and an optical fiber attenuation curve function obtained through an adjacent previous iterative computation; an optical fiber attenuation curve function obtained through a current iteration is computed according to the actual signal sequence of the optical signal, the compensation value, and the theoretical signal sequence of the PN sequence; and whether the optical fiber attenuation curve function obtained through the current iteration satisfies a given condition is further determined, and when it is determined that the optical fiber attenuation curve function obtained through the current iteration satisfies the given condition, performance of the measured optical fiber is determined according to the optical fiber attenuation curve function obtained through the current iteration.

In this way, real-time detection is performed on the PN sequence sent by the transmitter, real-time compensation is made for a reflected-back optical signal by using PN sequence change information obtained through detection, and an iterative algorithm is used. This effectively enhances a dynamic range of an optical time domain reflectometer.

The following further describes the embodiments of the present disclosure in detail with reference to the accompanying drawings of this specification. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
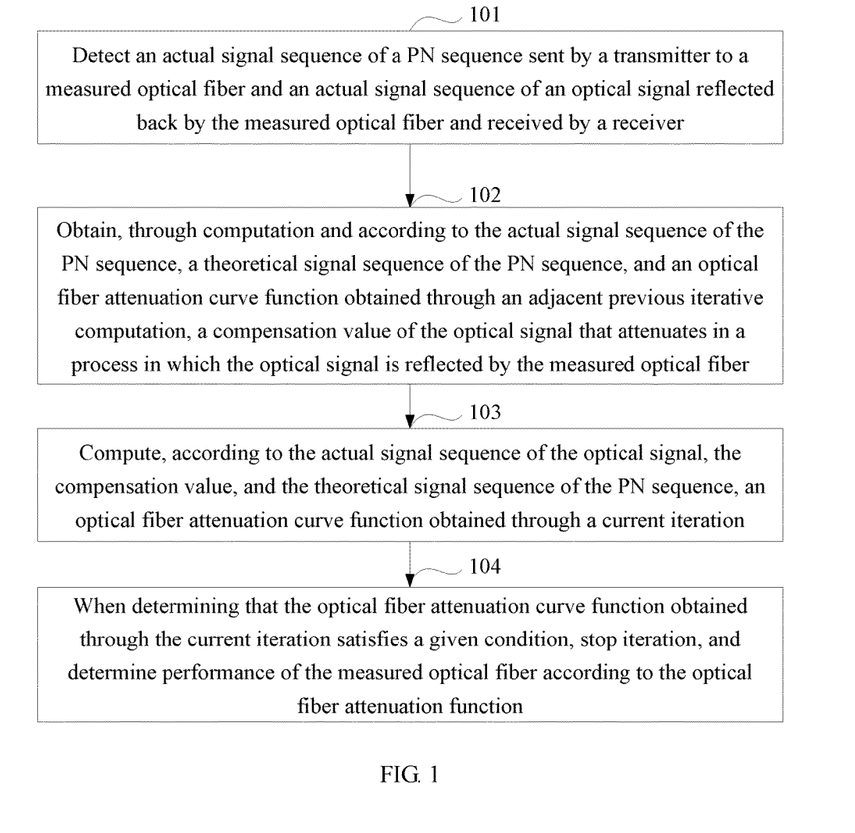
FIG. 1 is a schematic flowchart of a method for compensating for a signal error at a transmit end of an optical time domain reflectometer according to the present disclosure.

As shown in FIG. 1, FIG. 1 is a schematic flowchart of a method for compensating for a signal error at a transmit end of an optical time domain reflectometer according to the present disclosure. The method may be described as follows.

Step 101: Detect an actual signal sequence of a PN sequence sent by a transmitter to a measured optical fiber and an actual signal sequence of an optical signal reflected back by the measured optical fiber and received by a receiver.

In step 101, the transmitter sends the PN sequence to the measured optical fiber. The PN sequence is multiple optical pulses.

Specifically, a signal coupler couples received service data with a theoretical signal sequence of a generated PN sequence, so that the theoretical signal sequence of the PN sequence is modulated onto the service data; and electrical-to-optical conversion is performed on the service data modulated onto the theoretical signal sequence of the PN sequence, and a converted-to optical signal is sent to the measured optical fiber.

A optoelectronic detection device detects the actual signal sequence of the PN sequence sent to the measured optical fiber.

In addition, the optoelectronic detection device detects the actual signal sequence of the optical signal reflected back by the measured optical fiber and received by the receiver, and performs optical-to-electrical conversion, amplification, and filtering processing on the detected optical signal.

Step 102: Obtain, through computation and according to the actual signal sequence of the PN sequence, a theoretical signal sequence of the PN sequence, and an optical fiber attenuation curve function obtained through an adjacent previous iterative computation, a compensation value of the optical signal that attenuates in a process in which the optical signal is reflected by the measured optical fiber.

In step 102, a difference is first obtained through computation according to the actual signal sequence of the PN sequence and the theoretical signal sequence of the PN sequence.

Specifically, the actual signal sequence of the PN sequence and the theoretical signal sequence of the PN sequence are input in a subtractor to obtain the difference through computation by using the subtractor.

For example, if the theoretical signal sequence of the PN sequence is P, and the detected actual signal sequence of the PN sequence is Ps, the difference between the signal sequences that is obtained through computation by using the subtractor is (Ps−P).

Then, the compensation value of the optical signal that attenuates in a process in which the optical signal is reflected by the measured optical fiber is obtained through computation according to the difference and the optical fiber attenuation curve function obtained through the adjacent previous iterative computation.

Specifically, the compensation value of the optical signal that attenuates in a process in which the optical signal is reflected by the measured optical fiber is obtained through computation according to a function relationship between an optical fiber attenuation function of an optical time domain reflectometer and a correlation computation result of multiple optical pulses transmitted by a transmitter and an optical signal reflected by an optical fiber and received by a receiver, the difference, and the optical fiber attenuation function obtained through the adjacent previous iterative computation.

It should be noted herein that when computation of the compensation value is triggered for the first time, the optical fiber attenuation curve function obtained through the adjacent previous iterative computation includes at least one of the following optical fiber attenuation curve functions: an optical fiber attenuation curve function obtained through an offline test; or a prestored optical fiber attenuation curve function.

The function relationship between an optical fiber attenuation function of an optical time domain reflectometer and a correlation computation result of multiple optical pulses transmitted by a transmitter and an optical signal reflected by an optical fiber and received by a receiver may be expressed as: a reflected optical signal received by the receiver=convolution of the multiple optical pulses sent by the transmitter and the optical fiber attenuation function.

That is, when the difference between the signal sequences of the multiple optical pulses sent by the transmitter is obtained through computation, convolution of the difference and the optical fiber attenuation function obtained through the adjacent previous iterative computation is computed according to the difference and the optical fiber attenuation function obtained through the adjacent previous iterative computation, so as to obtain the compensation value of the optical signal that attenuates in a process in which the optical signal is reflected by the measured optical fiber.

For example, if the difference is (Ps−P) and the optical fiber attenuation function obtained through the adjacent previous iterative computation is $f_n$, the compensation value of the optical signal that attenuates in a process in which the optical signal is reflected by the measured optical fiber is (Ps−P)*$f_n$.

Step 103: Compute, according to the actual signal sequence of the optical signal, the compensation value, and the theoretical signal sequence of the PN sequence, an optical fiber attenuation curve function obtained through a current iteration.

In step 103, the detected actual signal sequence of the optical signal is first compensated for according to the compensation value, to obtain a theoretical signal sequence of the compensated optical signal.

Specifically, the theoretical signal sequence of the optical signal is obtained through computation according to the actual signal sequence of the optical signal and the compensation value.

For example, a difference between the actual signal sequence of the optical signal and the compensation value is computed, and the obtained difference is the theoretical signal sequence of the optical signal.

Assuming that the actual signal sequence of the optical signal is Rs and the compensation value is (Ps−P)*$f_n$, the theoretical signal sequence of the optical signal is Rs−(Ps−P)*$f_n$.

Then, the optical fiber attenuation curve function obtained through the current iteration is computed according to the theoretical signal sequence of the optical signal and the theoretical signal sequence of the PN sequence.

Specifically, correlation computation is performed on the theoretical signal sequence of the optical signal and the theoretical signal sequence of the PN sequence according to the function relationship between an optical fiber attenuation function of an optical time domain reflectometer and a correlation computation result of multiple optical pulses transmitted by a transmitter and an optical signal reflected by an optical fiber and received by a receiver, to obtain the optical fiber attenuation curve function obtained through the current iteration.

That is, the theoretical signal sequence of the optical signal=the theoretical signal sequence of the PN sequence*the optical fiber attenuation curve function obtained through the current iteration.

Step 104: When it is determined that the optical fiber attenuation curve function obtained through the current iteration satisfies a given condition, stop iteration, and determine performance of the measured optical fiber according to the optical fiber attenuation function.

In step 104, the determining that the optical fiber attenuation curve function obtained through the current iteration satisfies a given condition includes:

computing a difference between the optical fiber attenuation curve function obtained through the current iteration and the optical fiber attenuation curve function obtained through the adjacent previous iterative computation;

comparing the difference with a given threshold; and when the difference is less than the given threshold, determining that the optical fiber attenuation curve function obtained through the current iteration satisfies the given condition; or when the difference is not less than the given threshold, determining that the optical fiber attenuation curve function obtained through the current iteration does not satisfy the given condition, and triggering to perform an operation of obtaining, through computation and by using the optical fiber attenuation curve function obtained through the current iteration, the compensation value of the optical signal that attenuates in a process in which the optical signal is reflected by the optical fiber.

According to the solution described in this embodiment of the present disclosure, an actual signal sequence of a PN sequence sent by a transmitter to a measured optical fiber and an actual signal sequence of an optical signal reflected back by the measured optical fiber and received by a receiver are detected; a compensation value of the optical signal that attenuates in a process in which the optical signal is reflected by the measured optical fiber is obtained through computation according to the actual signal sequence of the PN sequence, a theoretical signal sequence of the PN sequence, and an optical fiber attenuation curve function obtained through an adjacent previous iterative computation; an optical fiber attenuation curve function obtained through a current iteration is computed according to the actual signal sequence of the optical signal, the compensation value, and the theoretical signal sequence of the PN sequence; and whether the optical fiber attenuation curve function obtained through the current iteration satisfies a given condition is further determined, and when it is determined that the optical fiber attenuation curve function obtained through the current iteration satisfies the given condition, performance of the measured optical fiber is determined according to the optical fiber attenuation curve function obtained through the current iteration. In this way, real-time detection is performed on the PN sequence sent by the transmitter, real-time compensation is made for a reflected-back optical signal by using PN sequence change information obtained through detection, and an iterative algorithm is used. This effectively enhances a dynamic range of an optical time domain reflectometer.

Figure 2:
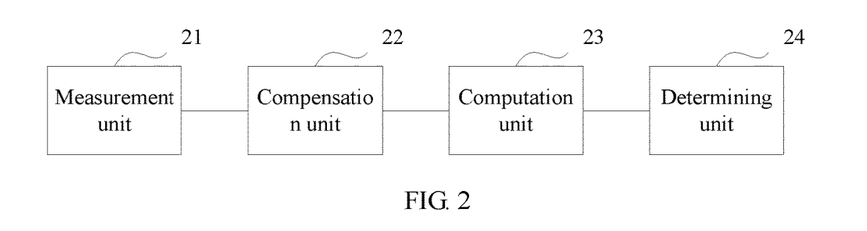
FIG. 2 is a schematic structural diagram of an apparatus for compensating for a signal error at a transmit end of an optical time domain reflectometer according to the present disclosure.

FIG. 2 is a schematic structural diagram of an apparatus for compensating for a signal error at a transmit end of an optical time domain reflectometer according to an embodiment of the present disclosure. The apparatus includes a measurement unit 21, a compensation unit 22, a computation unit 23, and a determining unit 24.

The measurement unit 21 is configured to detect an actual signal sequence of a pseudo-random optical pulse PN sequence sent by a transmitter to a measured optical fiber and an actual signal sequence of an optical signal reflected back by the measured optical fiber and received by a receiver.

The compensation unit 22 is configured to obtain, through computation and according to the actual signal sequence of the PN sequence, a theoretical signal sequence of the PN sequence, and an optical fiber attenuation curve function obtained through an adjacent previous iterative computation, a compensation value of the optical signal that attenuates in a process in which the optical signal is reflected by the measured optical fiber.

The computation unit 23 is configured to compute, according to the actual signal sequence of the optical signal, the compensation value, and the theoretical signal sequence of the PN sequence, an optical fiber attenuation curve function obtained through a current iteration.

The determining unit 24 is configured to determine, when determining that the optical fiber attenuation curve function obtained through the current iteration satisfies a given condition, performance of the measured optical fiber according to the optical fiber attenuation curve function obtained through the current iteration.

Specifically, that the determining unit 24 is specifically configured to determine that the optical fiber attenuation curve function obtained through the current iteration satisfies a given condition includes:

computing a difference between the optical fiber attenuation curve function obtained through the current iteration and the optical fiber attenuation curve function obtained through the adjacent previous iterative computation;

comparing the difference with a given threshold; and when the difference is less than the given threshold, determining that the optical fiber attenuation curve function obtained through the current iteration satisfies the given condition.

The determining unit 24 is further configured to: when the difference is not less than the given threshold, determine that the optical fiber attenuation curve function obtained through the current iteration does not satisfy the given condition, and trigger to perform an operation of computing, by using the optical fiber attenuation curve function obtained through the current iteration, a compensation value of the optical signal that attenuates in a next process in which the optical signal is reflected by the measured optical fiber.

Optionally, the compensation unit 22 is specifically configured to: compute a difference between the actual signal sequence of the PN sequence and the theoretical signal sequence of the PN sequence; and obtain, through computation and according to the difference and the optical fiber attenuation curve function obtained through the adjacent previous iterative computation, the compensation value of the optical signal that attenuates in a process in which the optical signal is reflected by the measured optical fiber.

That the compensation unit 22 is specifically configured to obtain, through computation and according to the difference between the signal sequences and the optical fiber attenuation function obtained through the adjacent previous iterative computation, the compensation value of the optical signal that attenuates in a process in which the optical signal is reflected by the measured optical fiber includes:

obtaining, through computation and according to a function relationship between an optical fiber attenuation function of an optical time domain reflectometer and a correlation computation result of multiple optical pulses transmitted by the transmitter and an optical signal reflected by the optical fiber and received by the receiver, the difference, and the optical fiber attenuation function obtained through the adjacent previous iterative computation, the compensation value of the optical signal that attenuates in a process in which the optical signal is reflected by the measured optical fiber.

Optionally, the computation unit 23 is specifically configured to obtain through computation a theoretical signal sequence of the optical signal according to the actual signal sequence of the optical signal and the compensation value; and compute, according to the theoretical signal sequence of the optical signal and the theoretical signal sequence of the PN sequence, the optical fiber attenuation curve function obtained through the current iteration.

That the computation unit 23 is specifically configured to compute, according to the theoretical signal sequence of the optical signal and the theoretical signal sequence of the PN sequence, the optical fiber attenuation curve function obtained through the current iteration includes:

performing, according to the function relationship between an optical fiber attenuation function of an optical time domain reflectometer and a correlation computation result of multiple optical pulses transmitted by a transmitter and an optical signal reflected by an optical fiber and received by a receiver, correlation computation on the theoretical signal sequence of the optical signal and the theoretical signal sequence of the PN sequence, to obtain the optical fiber attenuation curve function obtained through the current iteration.

Optionally, when computation of the compensation value is triggered for the first time, the optical fiber attenuation curve function obtained through the adjacent previous iterative computation includes at least one of the following optical fiber attenuation curve functions:

an optical fiber attenuation curve function obtained through an offline test; or a prestored optical fiber attenuation curve function.

It should be noted that the measurement unit provided in this embodiment of the present disclosure may be implemented by software or by hardware. This is not specifically limited herein.

Figure 3:
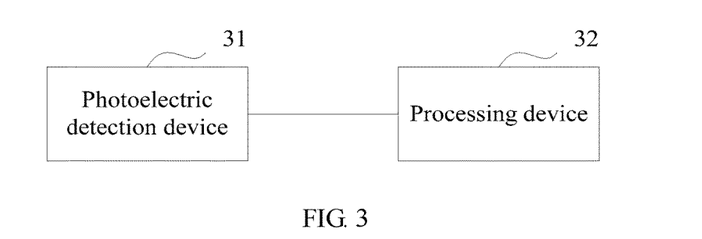
FIG. 3 is a schematic structural diagram of an apparatus for compensating for a signal error at a transmit end of an optical time domain reflectometer according to the present disclosure.

FIG. 3 is a schematic structural diagram of an apparatus for compensating for a signal error at a transmit end of an optical time domain reflectometer according to an embodiment of the present disclosure. The apparatus may include a optoelectronic detection device 31 and a processing device 32.

The optoelectronic detection device 31 is configured to detect an actual signal sequence of a pseudo-random optical pulse PN sequence sent by a transmitter to a measured optical fiber and an actual signal sequence of an optical signal reflected back by the measured optical fiber and received by a receiver.

The processing device 32 is configured to: obtain, through computation and according to the actual signal sequence of the PN sequence detected by the optoelectronic detection device, a theoretical signal sequence of the PN sequence, and an optical fiber attenuation curve function obtained through an adjacent previous iterative computation, a compensation value of the optical signal that attenuates in a process in which the optical signal is reflected by the measured optical fiber;

compute, according to the actual signal sequence of the optical signal detected by the optoelectronic detection device, the compensation value, and the theoretical signal sequence of the PN sequence, an optical fiber attenuation curve function obtained through a current iteration; and determine, when determining that the optical fiber attenuation curve function obtained through the current iteration satisfies a given condition, performance of the measured optical fiber according to the optical fiber attenuation curve function obtained through the current iteration.

Optionally, that the processing device 32 determines that the optical fiber attenuation curve function obtained through the current iteration satisfies a given condition includes:

computing a difference between the optical fiber attenuation curve function obtained through the current iteration and the optical fiber attenuation curve function obtained through the adjacent previous iterative computation;

comparing the difference with a given threshold; and when the difference is less than the given threshold, determining that the optical fiber attenuation curve function obtained through the current iteration satisfies the given condition.

Optionally, the processing device 32 is further configured to: when the difference is not less than the given threshold, determine that the optical fiber attenuation curve function obtained through the current iteration does not satisfy the given condition, and trigger to perform an operation of computing, by using the optical fiber attenuation curve function obtained through the current iteration, a compensation value of the optical signal that attenuates in a next process in which the optical signal is reflected by the measured optical fiber.

Optionally, that the processing device 32 obtains, through computation and according to the actual signal sequence of the PN sequence, a theoretical signal sequence of the PN sequence, and an optical fiber attenuation curve function obtained through an adjacent previous iterative computation, a compensation value of the optical signal that attenuates in a process in which the optical signal is reflected by the measured optical fiber includes:

computing a difference between the actual signal sequence of the PN sequence and the theoretical signal sequence of the PN sequence; and obtaining, through computation and according to the difference and the optical fiber attenuation curve function obtained through the adjacent previous iterative computation, the compensation value of the optical signal that attenuates in a process in which the optical signal is reflected by the measured optical fiber.

Optionally, that the processing device 32 obtains, through computation and according to the difference between the signal sequences and the optical fiber attenuation function obtained through the adjacent previous iterative computation, the compensation value of the optical signal that attenuates in a process in which the optical signal is reflected by the measured optical fiber includes:

obtaining, through computation and according to a function relationship between an optical fiber attenuation function of an optical time domain reflectometer and a correlation computation result of multiple optical pulses transmitted by the transmitter and an optical signal reflected by the optical fiber and received by the receiver, the difference, and the optical fiber attenuation function obtained through the adjacent previous iterative computation, the compensation value of the optical signal that attenuates in a process in which the optical signal is reflected by the measured optical fiber.

Optionally, that the processing device 32 computes, according to the actual signal sequence of the optical signal, the compensation value, and the theoretical signal sequence of the PN sequence, an optical fiber attenuation curve function obtained through a current iteration includes:

obtaining, through computation, a theoretical signal sequence of the optical signal according to the actual signal sequence of the optical signal and the compensation value; and computing, according to the theoretical signal sequence of the optical signal and the theoretical signal sequence of the PN sequence, the optical fiber attenuation curve function obtained through the current iteration.

Optionally, that the processing device 32 computes, according to the theoretical signal sequence of the optical signal and the theoretical signal sequence of the PN sequence, the optical fiber attenuation curve function obtained through the current iteration includes:

performing, according to the function relationship between an optical fiber attenuation function of an optical time domain reflectometer and a correlation computation result of multiple optical pulses transmitted by a transmitter and an optical signal reflected by an optical fiber and received by a receiver, correlation computation on the theoretical signal sequence of the optical signal and the theoretical signal sequence of the PN sequence, to obtain the optical fiber attenuation curve function obtained through the current iteration.

Optionally, when computation of the compensation value is triggered for the first time, the optical fiber attenuation curve function obtained through the adjacent previous iterative computation includes at least one of the following optical fiber attenuation curve functions:

an optical fiber attenuation curve function obtained through an offline test; or a prestored optical fiber attenuation curve function.

According to the apparatus described in this embodiment of the present disclosure, real-time detection is performed on a PN sequence sent by a transmitter, real-time compensation is made for a reflected-back optical signal by using PN sequence change information obtained through detection, and an iterative algorithm is used. This effectively enhances a dynamic range of an optical time domain reflectometer.

Figure 4:
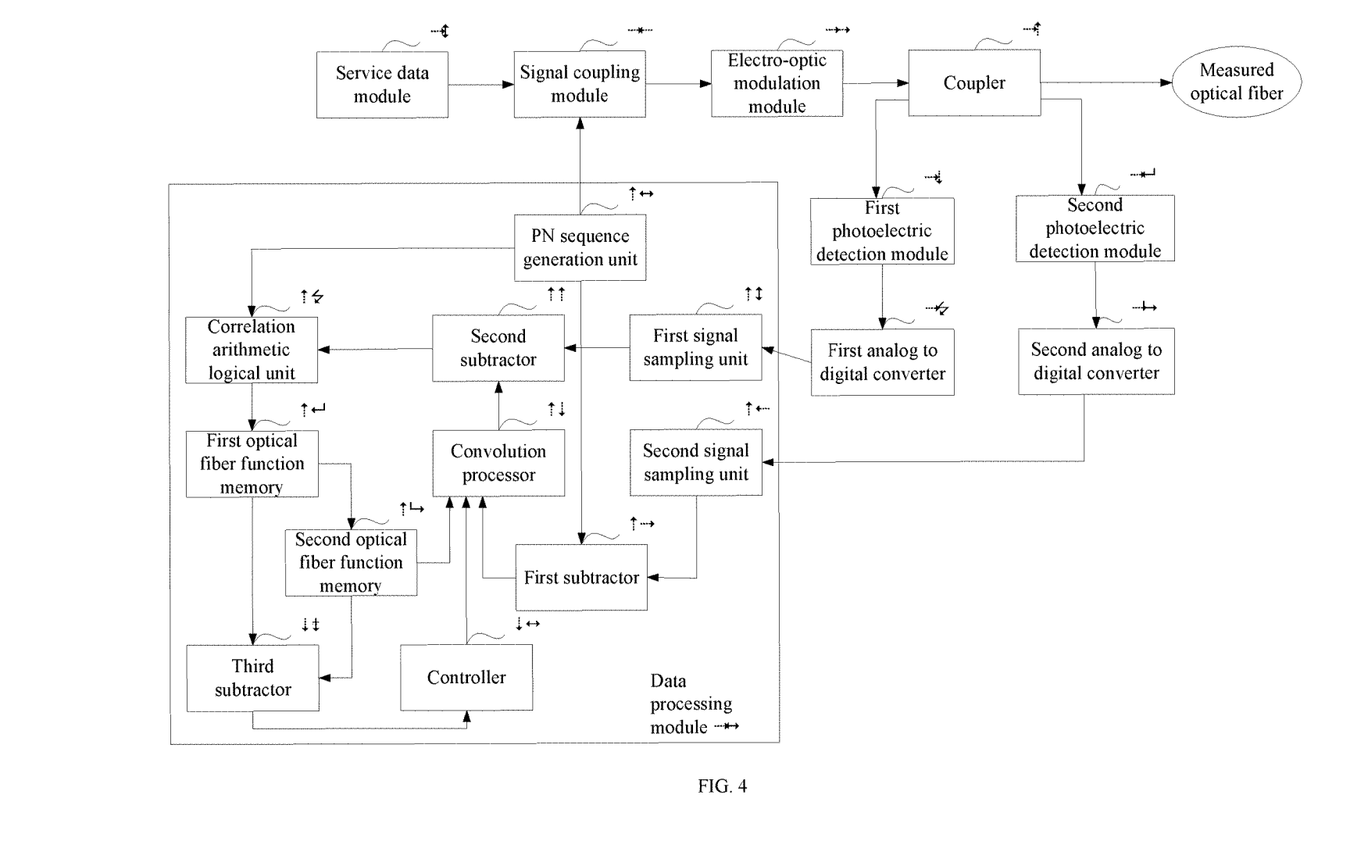
FIG. 4 is a schematic structural diagram of an optical time domain reflectometer according to the present disclosure.

FIG. 4 is a schematic structural diagram of an optical time domain reflectometer according to an embodiment of the present disclosure. The optical time domain reflectometer described in this embodiment of the present disclosure includes a data processing module 41, a service data module 42, a signal coupling module 43, an electro-optic modulation module 44, a coupler 45, a first optoelectronic detection module 46, a first analog to digital converter 47, a second optoelectronic detection module 48, and a second analog to digital converter 49.

The data processing module 41 has a function of the apparatus described in the embodiments of the present disclosure.

Specifically, the data processing module 41 may include a PN sequence generation unit 51, a first signal sampling unit 52, a second signal sampling unit 53, a first subtractor 54, a second subtractor 55, a convolution processor 56, a correlation arithmetic logical unit 57, a first optical fiber function memory 58, a second optical fiber function memory 59, a third subtractor 60, and a controller 61.

The service data module 42 is configured to: generate service data, and transmit the generated service data to the data processing module 41 and the signal coupling module 43.

The signal coupling module 43 is configured to couple the received service data with a PN sequence generated by the PN sequence generation unit 51 in the data processing module 41, so that the PN sequence is modulated onto the service data.

The electro-optic modulation module 44 is configured to: perform electrical-to-optical conversion on the service data, onto which the PN sequence is modulated, of the signal coupling module 43, and transmit service data that undergoes electrical-to-optical conversion to a measured optical fiber by using the coupler 45.

The first optoelectronic detection module 46 is configured to: receive an actual signal sequence of an optical signal reflected back by the measured optical fiber and received by a receive end of the coupler 45, perform analog-to-digital conversion on the actual signal sequence of the optical signal by using the first analog to digital converter 47, and send an actual signal sequence of the optical signal that undergoes analog-to-digital conversion to the first signal sampling unit 52 in the data processing module 41.

The second optoelectronic detection module 48 is configured to: detect, from a transmit end of the coupler 45, the actual signal sequence of the PN sequence sent to the measured optical fiber, and perform analog-to-digital conversion on the actual signal sequence of the PN sequence by using the second analog to digital converter 49, and send an actual signal sequence of the PN sequence that undergoes analog-to-digital conversion to the data processing module 41.

The first subtractor 54 is configured to: perform a difference operation between a theoretical signal sequence of the PN sequence generated in the PN sequence generation unit 51 and the actual signal sequence of the PN sequence collected in the second signal sampling unit 53, to obtain a difference, and send the difference is sent to the convolution processor 56.

The convolution processor 56 is configured to obtain, through computation and according to the difference and an optical fiber attenuation curve function that is obtained through an adjacent previous iterative computation and that is stored in the second optical fiber function memory 59, a compensation value of the optical signal that attenuates in a process in which the optical signal is reflected by the measured optical fiber.

The second subtractor 55 is configured to perform computation on the compensation value obtained through computation by the convolution processor 56 and the actual signal sequence of the optical signal collected by the first signal sampling unit 52, to obtain a theoretical signal sequence of the optical signal.

The correlation arithmetic logical unit 57 is configured to: obtain, through computation and according to the theoretical signal sequence of the PN sequence generated in the PN sequence generation unit 51 and the theoretical signal sequence of the optical signal obtained by the second subtractor 55 through computation, an optical fiber attenuation curve function obtained through a current iteration, and store the obtained optical fiber attenuation curve function into the first optical fiber function memory 58.

The third subtractor 60 is configured to: compute a difference between the optical fiber attenuation curve function obtained through the current iteration that is stored in the first optical fiber function memory 58 and the optical fiber attenuation curve function obtained through the adjacent previous iterative computation that is stored in the second optical fiber function memory 59, and send the difference to the controller 61.

The controller 61 is configured to: compare the difference with a given threshold; when the difference is less than the given threshold, determine that the optical fiber attenuation curve function obtained through the current iteration satisfies a given condition; and determine, when determining that the optical fiber attenuation curve function obtained through the current iteration satisfies the given condition, performance of the measured optical fiber according to the optical fiber attenuation curve function obtained through the current iteration; or when the difference is not less than the given threshold, determine that the optical fiber attenuation curve function obtained through the current iteration does not satisfy the given condition, and trigger the convolution processor to perform an operation of computing, by using the optical fiber attenuation curve function obtained through the current iteration, a compensation value of the optical signal that attenuates in a next process in which the optical signal is reflected by the measured optical fiber.

It should be noted that when the difference is not less than the given threshold, it is determined that the optical fiber attenuation curve function obtained through the current iteration does not satisfy the given condition, the optical fiber attenuation curve function obtained through the current iteration is sent by the first optical fiber function memory 58 to the second optical fiber function memory 59, to update the optical fiber attenuation curve function obtained through the adjacent previous iterative computation that is stored in the second optical fiber function memory 59.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for compensating for a signal error at a transmit end of an optical time domain reflectometer, the method comprising:
   detecting an actual signal sequence of a pseudo-random optical pulse (PN) sequence sent by a transmitter to a measured optical fiber and an actual signal sequence of an optical signal reflected back by the measured optical fiber and received by a receiver;
   obtaining, through computation and according to the actual signal sequence of the PN sequence, a theoretical signal sequence of the PN sequence and an optical fiber attenuation curve function obtained through an adjacent previous iterative computation, a compensation value of the optical signal that attenuates in a process in which the optical signal is reflected by the measured optical fiber;
   computing, according to the actual signal sequence of the optical signal, the compensation value and the theoretical signal sequence of the PN sequence, an optical fiber attenuation curve function obtained through a current iteration; and
   determining that the optical fiber attenuation curve function obtained through the current iteration satisfies a given condition, and determining performance of the measured optical fiber according to the optical fiber attenuation curve function obtained through the current iteration.

2. The method according to claim 1, wherein determining that the optical fiber attenuation curve function obtained through the current iteration satisfies a given condition comprises:
   computing a difference between the optical fiber attenuation curve function obtained through the current iteration and the optical fiber attenuation curve function obtained through the adjacent previous iterative computation;
   comparing the difference with a given threshold; and
   when the difference is less than the given threshold, determining that the optical fiber attenuation curve function obtained through the current iteration satisfies the given condition.

3. The method according to claim 2, further comprising:
   when the difference is not less than the given threshold, determining that the optical fiber attenuation curve function obtained through the current iteration does not satisfy the given condition; and
   computing, by using the optical fiber attenuation curve function obtained through the current iteration, a compensation value of the optical signal that attenuates in a next process in which the optical signal is reflected by the measured optical fiber.

4. The method according to claim 1, wherein obtaining, through computation and according to the actual signal sequence of the PN sequence, a theoretical signal sequence of the PN sequence and an optical fiber attenuation curve function obtained through an adjacent previous iterative computation, a compensation value of the optical signal that attenuates in a process in which the optical signal is reflected by the measured optical fiber comprises:
   computing a difference between the actual signal sequence of the PN sequence and the theoretical signal sequence of the PN sequence; and
   obtaining, through computation and according to the difference and the optical fiber attenuation curve function obtained through the adjacent previous iterative computation, the compensation value of the optical signal that attenuates in a process in which the optical signal is reflected by the measured optical fiber.

5. The method according to claim 4, wherein obtaining, through computation and according to the difference between the signal sequences and the optical fiber attenuation curve function obtained through the adjacent previous iterative computation, the compensation value of the optical signal that attenuates in a process in which the optical signal is reflected by the measured optical fiber comprises:
   obtaining, through computation and according to a function relationship between an optical fiber attenuation curve function of an optical time domain reflectometer and a correlation computation result of multiple optical pulses transmitted by the transmitter and an optical signal reflected by the optical fiber and received by the receiver, the difference and the optical fiber attenuation curve function obtained through the adjacent previous iterative computation, the compensation value of the optical signal that attenuates in a process in which the optical signal is reflected by the measured optical fiber.

6. The method according to claim 1, wherein computing, according to the actual signal sequence of the optical signal, the compensation value and the theoretical signal sequence of the PN sequence, an optical fiber attenuation curve function obtained through a current iteration comprises:

obtaining, through computation, a theoretical signal sequence of the optical signal according to the actual signal sequence of the optical signal and the compensation value; and computing, according to the theoretical signal sequence of the optical signal and the theoretical signal sequence of the PN sequence, the optical fiber attenuation curve function obtained through the current iteration.

7. The method according to claim 6, wherein computing, according to the theoretical signal sequence of the optical signal and the theoretical signal sequence of the PN sequence, the optical fiber attenuation curve function obtained through the current iteration comprises:

performing, according to the function relationship between an optical fiber attenuation curve function of an optical time domain reflectometer and a correlation computation result of multiple optical pulses transmitted by a transmitter and an optical signal reflected by an optical fiber and received by a receiver, correlation computation on the theoretical signal sequence of the optical signal and the theoretical signal sequence of the PN sequence, to obtain the optical fiber attenuation curve function obtained through the current iteration.

8. An apparatus for compensating for a signal error at a transmit end of an optical time domain reflectometer, the apparatus comprising:

an optoelectronic detection device is configured to:
  detect an actual signal sequence of a pseudo-random optical pulse PN sequence sent by a transmitter to a measured optical fiber and an actual signal sequence of an optical signal reflected back by the measured optical fiber and received by a receiver; and at least one processor, configured to:
  obtain, through computation and according to the actual signal sequence of the PN sequence, a theoretical signal sequence of the PN sequence and an optical fiber attenuation curve function obtained through an adjacent previous iterative computation, a compensation value of the optical signal that attenuates in a process in which the optical signal is reflected by the measured optical fiber,
  compute, according to the actual signal sequence of the optical signal, the compensation value and the theoretical signal sequence of the PN sequence, an optical fiber attenuation curve function obtained through a current iteration,
  determine that the optical fiber attenuation curve function obtained through the current iteration satisfies a given condition, and
  determine performance of the measured optical fiber according to the optical fiber attenuation curve function obtained through the current iteration.

9. The apparatus according to claim 8, wherein to determine that the optical fiber attenuation curve function obtained through the current iteration satisfies a given condition, the at least one processor is configured to:

compute a difference between the optical fiber attenuation curve function obtained through the current iteration and the optical fiber attenuation curve function obtained through the adjacent previous iterative computation;

compare the difference with a given threshold; and when the difference is less than the given threshold, determine that the optical fiber attenuation curve function obtained through the current iteration satisfies the given condition.

10. The apparatus according to claim 9, wherein the at least one processor is further configured to:

when the difference is not less than the given threshold, determine that the optical fiber attenuation curve function obtained through the current iteration does not satisfy the given condition; and compute, by using the optical fiber attenuation curve function obtained through the current iteration, a compensation value of the optical signal that attenuates in a next process in which the optical signal is reflected by the measured optical fiber.

11. The apparatus according to claim 8, wherein to compute, according to the actual signal sequence of the optical signal, the compensation value and the theoretical signal sequence of the PN sequence, the optical fiber attenuation curve function obtained through the current iteration, the at least one processor is configured to:

compute a difference between the actual signal sequence of the PN sequence and the theoretical signal sequence of the PN sequence; and obtain, through computation and according to the difference and the optical fiber attenuation curve function obtained through the adjacent previous iterative computation, the compensation value of the optical signal that attenuates in a process in which the optical signal is reflected by the measured optical fiber.

12. The apparatus according to claim 11, wherein to obtain, through computation and according to the difference between the signal sequences and the optical fiber attenuation curve function obtained through the adjacent previous iterative computation, the compensation value of the optical signal that attenuates in a process in which the optical signal is reflected by the measured optical fiber, the at least one processor is configured to:

obtain, through computation and according to a function relationship between an optical fiber attenuation curve function of an optical time domain reflectometer and a correlation computation result of multiple optical pulses transmitted by the transmitter and an optical signal reflected by the optical fiber and received by the receiver, the difference and the optical fiber attenuation curve function obtained through the adjacent previous iterative computation, the compensation value of the optical signal that attenuates in a process in which the optical signal is reflected by the measured optical fiber.

13. The apparatus according to claim 8, wherein to compute, according to the actual signal sequence of the optical signal, the compensation value and the theoretical signal sequence of the PN sequence, an optical fiber attenuation curve function obtained through a current iteration, the at least one processor is configured to:

obtain, through computation, a theoretical signal sequence of the optical signal according to the actual signal sequence of the optical signal and the compensation value; and compute, according to the theoretical signal sequence of the optical signal and the theoretical signal sequence of the PN sequence, the optical fiber attenuation curve function obtained through the current iteration.

14. The apparatus according to claim 13, wherein to compute, according to the theoretical signal sequence of the optical signal and the theoretical signal sequence of the PN sequence, the optical fiber attenuation curve function obtained through the current iteration, the at least one processor is configured to:

perform, according to the function relationship between an optical fiber attenuation curve function of an optical time domain reflectometer and a correlation computation result of multiple optical pulses transmitted by a transmitter and an optical signal reflected by an optical fiber and received by a receiver, correlation computation on the theoretical signal sequence of the optical signal and the theoretical signal sequence of the PN sequence, to obtain the optical fiber attenuation curve function obtained through the current iteration.

15. An apparatus for compensating for a signal error at a transmit end of an optical time domain reflectometer, the apparatus comprising:
a photodetector configured to:
detect an actual signal sequence of a pseudo-random optical pulse PN sequence sent by a transmitter to a measured optical fiber and an actual signal sequence of an optical signal reflected back by the measured optical fiber and received by a receiver; and
at least one processor is configured to:
obtain, through computation and according to the actual signal sequence of the PN sequence detected by the photodetector, a theoretical signal sequence of the PN sequence and an optical fiber attenuation curve function obtained through an adjacent previous iterative computation, a compensation value of the optical signal that attenuates in a process in which the optical signal is reflected by the measured optical fiber,
compute, according to the actual signal sequence of the optical signal detected by the photodetector, the compensation value and the theoretical signal sequence of the PN sequence, an optical fiber attenuation curve function obtained through a current iteration,
determine that the optical fiber attenuation curve function obtained through the current iteration satisfies a given condition, and
determine performance of the measured optical fiber according to the optical fiber attenuation curve function obtained through the current iteration.

16. The apparatus according to claim 15, wherein to determine that the optical fiber attenuation curve function obtained through the current iteration satisfies a given condition, the at least one processor is configured to:
compute a difference between the optical fiber attenuation curve function obtained through the current iteration and the optical fiber attenuation curve function obtained through the adjacent previous iterative computation;
compare the difference with a given threshold; and
when the difference is less than the given threshold, determine that the optical fiber attenuation curve function obtained through the current iteration satisfies the given condition.

17. The apparatus according to claim 16, wherein the at least one processor is further configured to:
when the difference is not less than the given threshold, determine that the optical fiber attenuation curve function obtained through the current iteration does not satisfy the given condition; and compute, by using the optical fiber attenuation curve function obtained through the current iteration, a compensation value of the optical signal that attenuates in a next process in which the optical signal is reflected by the measured optical fiber.

18. The apparatus according to claim 15, wherein to obtain, through computation and according to the actual signal sequence of the PN sequence, a theoretical signal sequence of the PN sequence, and an optical fiber attenuation curve function obtained through an adjacent previous iterative computation, a compensation value of the optical signal that attenuates in a process in which the optical signal is reflected by the measured optical fiber, the at least one processor is configured to:
compute a difference between the actual signal sequence of the PN sequence and the theoretical signal sequence of the PN sequence; and
obtain, through computation and according to the difference and the optical fiber attenuation curve function obtained through the adjacent previous iterative computation, the compensation value of the optical signal that attenuates in a process in which the optical signal is reflected by the measured optical fiber.

19. The apparatus according to claim 18, wherein to obtain, through computation and according to the difference between the signal sequences and the optical fiber attenuation curve function obtained through the adjacent previous iterative computation, the compensation value of the optical signal that attenuates in a process in which the optical signal is reflected by the measured optical fiber, the at least one processor is configured to:
obtain, through computation and according to a function relationship between an optical fiber attenuation curve function of an optical time domain reflectometer and a correlation computation result of multiple optical pulses transmitted by the transmitter and an optical signal reflected by the optical fiber and received by the receiver, the difference and the optical fiber attenuation curve function obtained through the adjacent previous iterative computation, the compensation value of the optical signal that attenuates in a process in which the optical signal is reflected by the measured optical fiber.

20. The apparatus according to claim 15, wherein to compute, according to the actual signal sequence of the optical signal, the compensation value and the theoretical signal sequence of the PN sequence, an optical fiber attenuation curve function obtained through a current iteration, the at least one processor is configured to:
obtain, through computation, a theoretical signal sequence of the optical signal according to the actual signal sequence of the optical signal and the compensation value; and
compute, according to the theoretical signal sequence of the optical signal and the theoretical signal sequence of the PN sequence, the optical fiber attenuation curve function obtained through the current iteration.

* * * * *